April 20, 1954 W. ANGST 2,675,732
ADJUSTABLE POST FOR INSTRUMENT ASSEMBLIES
Filed Dec. 8, 1950
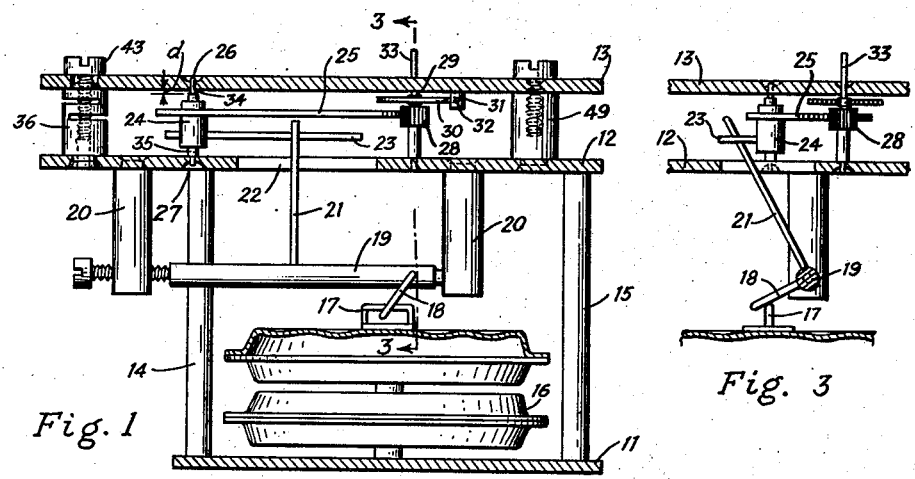
Fig. 1
Fig. 3
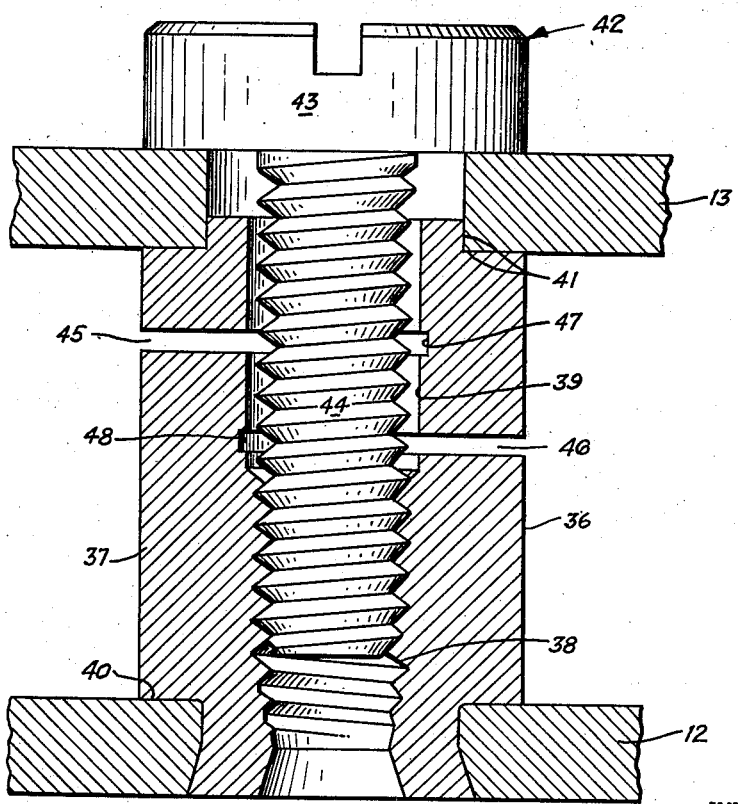
Fig. 2
INVENTOR.
WALTER ANGST
BY
Howard G. Russell
his ATTORNEY Patented Apr. 20, 1954

2,675,732

UNITED STATES PATENT OFFICE 2,675,732

ADJUSTABLE POST FOR INSTRUMENT ASSEMBLIES

Walter Angst, Manhasset, N. Y., assignor, by mesne assignments, to Kollsman Instrument Corporation, Elmhurst, N. Y., a corporation of New York Application December 8, 1950, Serial No. 199,809

2 Claims. (Cl. 85—1.5)

This invention relates to improvements in precision instruments and provides an improved post construction for spacing the mounting plates of instrument mechanisms between which movable elements, such as shafts, stems, gears, and other elements are mounted.

In many instruments, for example clock-works or gear trains, it is not objectionable, if shafts or stems are mounted between the plates with a certain freedom of axial movement. However, there are many instances where the amount of the axial play is critical and requires accurate adjustment. It has been customary in such instances to depart from the convenient construction of using the plates themselves as bearings and to provide individual bearings which are adjustable with respect to the mounting plates. This is a somewhat inconvenient, and moreover expensive, procedure involving more parts and more expensive machining.

The invention provides a novel form of spacer which permits the distance of the mounting plates to be easily varied or adjusted within certain limits thus eliminating the necessity of special adjustable bearings for shafts or other elements for which the freedom of axial movement is critical.

The objects, features, and advantages of this invention will appear more fully from the detailed description which follows accompanied by drawings showing, for the purpose of illustration, a preferred embodiment of the invention.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1 is an elevational view, partly in cross section, of an instrument assembly incorporating the novel post;

Figure 2 is a cross sectional elevation on an enlarged scale through the post proper; and Figure 3 is a side view of certain elements shown in Figure 1, the view being taken on line 3—3 of Figure 1.

In the following description and in the claims various details will be identified by specific names for convenience. The names, however, are intended to be as generic in their application as the art will permit. Corresponding reference characters refer to corresponding parts in the several figures of the drawings.

In the drawings accompanying, and forming part of, this specification, certain specific disclosure of the invention is made for the purpose of explanation of broader aspects of the invention, but it is understood that the details may be modified in various respects without departure from the principles of the invention and that the invention may be applied to other structures than the one shown.

The apparatus shown in Figure 1 comprises three mounting plates 11, 12 and 13 between which various instrument elements are mounted. The plates 11 and 12 are spaced by posts 14 and 15 of conventional construction. A diaphragm capsule assembly 16 is mounted on the base plate 11 and carries a boss 17 engaging an arm 18 of a rocking shaft 19 pivotally mounted in depending lugs one of which is visible at 20.

The rocking shaft 19 has a further arm 21 extending through an aperture 22 in the plate 12 engaging an arm 23 on a shaft 24 carrying a gear sector 25. The shaft 24 is mounted for rotation in bearings 26 and 27 drilled in the plates 12 and 13 in a conventional manner.

The gear sector 25 meshes with the pinion 28 on a shaft 29. The pinion shaft 29 is spring biased by a conventional hairspring 30 whose outer end is clamped in a post 31 or 32. The hairspring eliminates play and lost motion between the gears and between the engaging arms of the shaft 24 and of the rocking shaft 19. The shaft 29 is shown as having an extension or hand staff 33 extending through the plate 13 for the support of a pointer or other indicating element (not shown).

The spacing of the plates 12 and 13 must obviously be greater than the distance between the thrust surfaces 34 and 35 of the shaft 24 to provide for the necessary freedom of rotation. It is apparent, however, that the axial play $d$ of the shaft 24 may be the cause of rotation of the shaft 33 without an accompanying movement of the diaphragm capsule if, due to vibration, shock, or other causes the shaft 24 shifts axially so that the play is eliminated at 34 and is present at 35. Such axial shifting of the shaft 24 permits the shaft 29 to turn due to the variation in the angular engagement between the arms 21 and 23 which are maintained in contact by the biasing action of the hairspring. It is thus evident that the conventional mounting of shafts in holes drilled in the supporting plates may become a source of errors in the indication.

The invention provides a simple and improved form of spacer or post permitting adjustment of the distance between two mounting plates to an extent sufficient to reduce the aforementioned axial play and the resultant errors to a permissible minimum.

This is accomplished by installation of at least one post whose overall length may be reduced by an amount necessary to reduce the axial play of the critical shaft. The post is preferably placed closely to the critical shaft in order to reduce the range within which the post must be adjustable. This post or spacer is shown at 36 in Figure 1 and is shown in enlarged cross sectional view in Figure 2.

The post comprises a body 37 of either round or polygonal cross section. The post has an internal bore, the bore being screw-threaded at one end of the post as shown at 38 and being plain, and of larger internal diameter, at the other end of the post as shown at 39. The body has plate engaging shoulders 40 and 41. One of the shoulders, 40, is shown as being of greater length than the other for permanent attachment to the plate 12 by riveting, spinning or heading over in a manner well known per se in the instrument art. The other shouldered end 41 may be shorter for attachment of the mounting plate 13 by a screw 42. The screw may be of the machine screw type comprising a head 43 and a threaded stem 44. The threaded stem passes freely through the plain bore 39 without screw-thread engagement, but engages the threaded portion of the bore 38.

Slots 45 and 46 extend into the body of the post within the plain-bore-portion and extend preferably beyond the bore proper as shown at 47 and 48. The slots are longitudinally spaced with respect to the post and are also circumferentially spaced. In the event two slots are employed, the slots are offset 180 degrees with respect to each other. If three slots are used, it is advantageous to offset them 120 degrees with respect to one another.

It is apparent from Figure 2 that tightening of the screw 42 first presses the mounting plate 13 firmly against the shoulder 41. Continued tightening of the screw causes the plate 13 to move closer towards the plate 12, within the freedom permitted by the slots. In the illustrated embodiment the maximum reduction in length of the post 36 is approximately equal to the width of one of the slots 45, 46.

Returning now to Figure 1 it is evident that by tightening of the screw 42 the axial play $d$ of the shaft 24 may be reduced to any desired extent. It is normally not necessary that all the posts between the plates 12 and 13 are of the novel adjustable type. The post 49, for example, may be a conventional post of a fixed length. In such a case the post 49 acts as a fulcrum about which the mounting plate 13 tilts. Nevertheless, all the posts 49 may be of the type shown at 36.

Obviously the present invention is not restricted to pressure responsive instruments but has general application to other forms of precision instruments, including clocks in which the axial freedom of the balance wheel may thus be adjusted.

What is claimed is:
1. An adjustable post for spacing a pair of plates; said plates having aligned openings; said post having a diameter substantially larger than the openings and extensions at each end of smaller diameter than the openings and introducible into said openings; said extensions defining shoulders against which said plates may rest; means for securing one of said extensions to one of said plates at the opening in said one plate; said post having a longitudinal bore; the interior of said bore being threaded adjacent said one end of said post which is securable to said one plate; the bore being substantially smooth for a substantial portion thereof adjacent the other end; a transverse slot in said post extending through the material of said post surrounding the smooth portion of said bore and communicating with the periphery of said post; a screw having a head engaging the outer surface of said other plate at the opening therein and extending through the extension at the other end of the post; said screw passing through the smooth portion of the bore and engaging the threaded portion thereof; rotation of said screw after the head engages the said other plate collapsing the post at said slot and decreasing the distance between the plates.

2. An adjustable post for spacing a pair of plates; said plates having aligned openings; said post having a diameter substantially larger than the openings and extensions at each end of smaller diameter than the openings and introducible into said openings; said extensions defining shoulders against which said plates may rest; means for securing one of said extensions to one of said plates at the opening in said one plate; said post having a longitudinal bore; the interior of said bore being threaded adjacent said one end of said post which is securable to said one plate; the bore being substantially smooth for a substantial portion thereof adjacent the other end; a plurality of transverse spaced parallel slots in said post; each slot extending through the material of said post surrounding the smooth portion of said bore and communicating with the periphery of said post at angularly different positions; a screw having a head engaging the outer surface of said other plate at the opening therein and extending through the extension at the other end of the post; said screw passing through the smooth portion of the bore and engaging the threaded portion thereof; rotation of said screw after the head engages the said other plate collapsing the post at said slots and decreasing the distance between the plates.

References Cited in the file of this patent

UNITED STATES PATENTS

| Number | Name | Date |
| --- | --- | --- |
| 1,537,819 | Grimm | May 12, 1925 |
| 2,359,031 | Goshia | Sept. 26, 1944 |